(12) United States Patent
Nino Baron et al.

(10) Patent No.: US 10,965,192 B2
(45) Date of Patent: Mar. 30, 2021

(54) COOLING SYSTEM FOR A ROTARY ELECTRIC MACHINE

(71) Applicant: Caterpillar Inc., Deerfield, IL (US)

(72) Inventors: Carlos E. Nino Baron, Edwards, IL (US); Christopher J. Watson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/382,914

(22) Filed: Apr. 12, 2019

(65) Prior Publication Data
US 2020/0328655 A1   Oct. 15, 2020

(51) Int. Cl.
| H02K 3/24 | (2006.01) |
| H02K 9/00 | (2006.01) |
| H02K 1/20 | (2006.01) |
| H02K 1/32 | (2006.01) |

(52) U.S. Cl.
CPC ............... *H02K 9/005* (2013.01); *H02K 1/20* (2013.01); *H02K 1/32* (2013.01)

(58) Field of Classification Search
CPC ............ H02K 3/24; H02K 3/48; H02K 3/345; H02K 1/20; H02K 1/165; H02K 9/19
See application file for complete search history.

(56) References Cited

U.S. PATENT DOCUMENTS

| 4,994,700 | A | * | 2/1991 | Bansal ................... H02K 3/24 310/215 |
| 6,777,836 | B2 | | 8/2004 | Tong et al. |
| 7,737,586 | B2 | | 6/2010 | Tounosu et al. |
| 8,053,938 | B2 | | 11/2011 | Pal et al. |
| 9,035,503 | B2 | | 5/2015 | Trago et al. |
| 9,543,809 | B2 | | 1/2017 | Hodowanec et al. |
| 9,621,011 | B2 | | 4/2017 | Wirsch, Jr. et al. |
| 10,075,030 | B2 | | 9/2018 | Klassen |
| 2013/0076170 | A1 | | 3/2013 | Adra et al. |
| 2017/0117784 | A1 | | 4/2017 | Guo et al. |
| 2017/0155295 | A1 | | 6/2017 | Adra et al. |
| 2020/0072244 | A1 | * | 3/2020 | Baumann ................. H02K 1/32 |

FOREIGN PATENT DOCUMENTS

| CN | 106655563 A | 5/2017 |
| DE | 102014213159 A1 | 1/2016 |
| EP | 2879276 | 6/2015 |
| EP | 2463991 A3 | 8/2016 |
| GB | 2526253 A | 11/2015 |

* cited by examiner

*Primary Examiner* — Dang D Le
(74) *Attorney, Agent, or Firm* — Leydig, Voit & Mayer, Ltd.

(57) ABSTRACT

A rotary electric machine includes a stator, a rotor, a plurality of coils and a plurality of spacers. The stator has a stator body and a plurality of stator poles. Each stator pole has a pair of oppositely facing side surfaces. The rotor is positioned within the stator and has a plurality of rotor poles. One coil is disposed about each stator pole. The spacers are disposed between one coil and at least one of an inner circumferential surface of the stator body and the side surfaces of the stator body to define a fluid flow opening between the coil and the stator.

20 Claims, 13 Drawing Sheets

COOLING SYSTEM FOR A ROTARY ELECTRIC MACHINE

TECHNICAL FIELD

This disclosure relates generally to a rotary electric machine and, more particularly, to a cooling system for a rotary electric machine.

BACKGROUND

Work machines may be powered by electrical propulsion systems. The electrical propulsion systems sometimes include electric drive traction systems that provide driving forces to traction devices of the work machines. In some electric drive traction systems, switched reluctance motors are used to provide the driving force.

Switched reluctance motors may have various motor topologies (e.g., the number of stator poles, the number of coils, and the number of rotor poles). In addition, a switched reluctance motor may be configured with a plurality of phases (e.g., 2 phases, 3 phases, 4 phases, or more). A switched reluctance motor may have a plurality of stator poles, each with a winding of electrically conductive wires or coil positioned therearound. The number of wires and the configuration of the coil is one factor that affects the efficiency of the operation of the switched reluctance motor.

The operation of a switched reluctance motor may generate a significant amount of heat within the motor. Cooling of the switched reluctance motors may be performed in many manners. In some instances, convection cooling systems are provided to draw heat from the switched reluctance motors. Improvements in cooling of switched reluctance motors is desirable to increase power generation, efficiency and lifespan.

U.S. Pat. No. 9,621,011 discloses a switched reluctance motor having a stator with a plurality of stator poles having windings thereon and a rotor rotatable relative to the stator. A stator sleeve is located about the stator core and includes a convection reservoir extending along and in a thermally conductive confronting relationship with at least a portion of the windings. A delivery reservoir is provided with a plurality of transfer ports fluidly coupling the convection reservoir with the delivery reservoir.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a rotary electric machine includes a stator, a rotor, a plurality of coils, and a plurality of spacers. The stator has a stator body with an inner circumferential surface and a plurality of stator poles extending radially away from the inner circumferential surface. Each stator pole has a pair of oppositely facing side surfaces with the side surfaces of adjacent stator poles facing each other. The rotor is positioned within the stator and has a plurality of rotor poles. One coil is disposed about each stator pole and each coil has a plurality of electrically conductive wires defining a group of wires. The group of wires is wrapped around its respective stator pole to define a plurality of turns of the group of wires about the stator pole and each coil further has an inner surface positioned generally adjacent the side surfaces of its respective stator pole, an insertion end positioned generally adjacent the stator body, and a rotor end positioned opposite the insertion end. Each spacer is disposed between one coil and at least one of the inner circumferential surface of the stator body and the side surfaces of the stator body to define a fluid flow opening between the coil and the stator.

In another aspect, a rotary electric machine includes a stator, a rotor, a plurality of coils, a plurality of spacers, and a fluid system. The stator has a stator body with an inner circumferential surface and a plurality of stator poles extending radially away from the inner circumferential surface. Each stator pole has a pair of oppositely facing side surfaces with the side surfaces of adjacent stator poles facing each other. The rotor is positioned within the stator and has a plurality of rotor poles. One coil is disposed about each stator pole and each coil has a plurality of electrically conductive wires defining a group of wires. The group of wires is wrapped around its respective stator pole to define a plurality of turns of the group of wires about the stator pole and each coil further has an inner surface positioned generally adjacent the side surfaces of its respective stator pole, an insertion end positioned generally adjacent the stator body, and a rotor end positioned opposite the insertion end. Each spacer is disposed between one coil and at least one of the inner circumferential surface of the stator body and the side surfaces of the stator body to define a fluid flow opening between the coil and the stator. A port is disposed adjacent at least one end of the fluid flow opening. The fluid system includes a cooling fluid that flows through the fluid flow opening and through the port.

DETAILED DESCRIPTION

Figure 1:
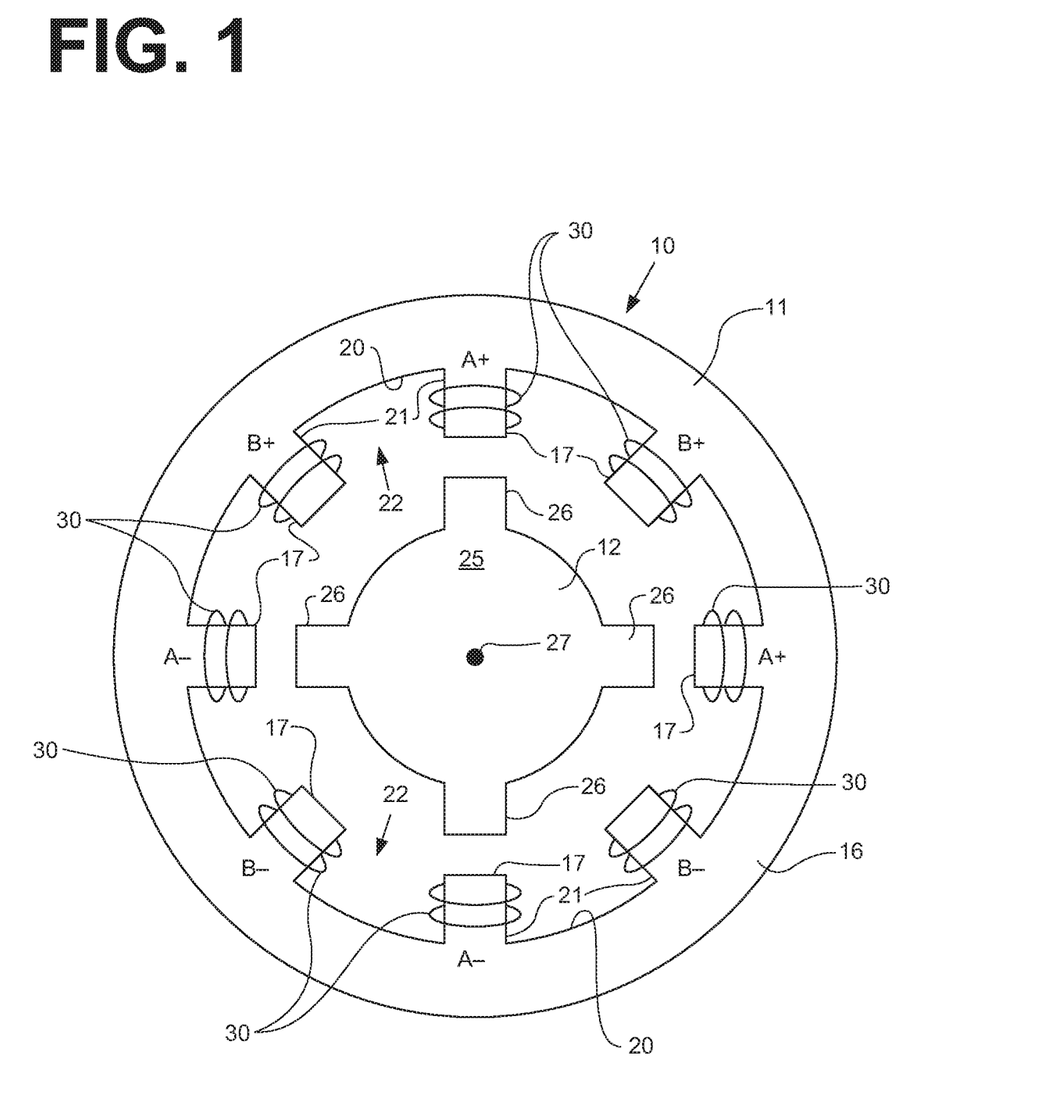
FIG. 1 is a diagrammatic end view of a portion of a switched reluctance motor.
Figure 2:
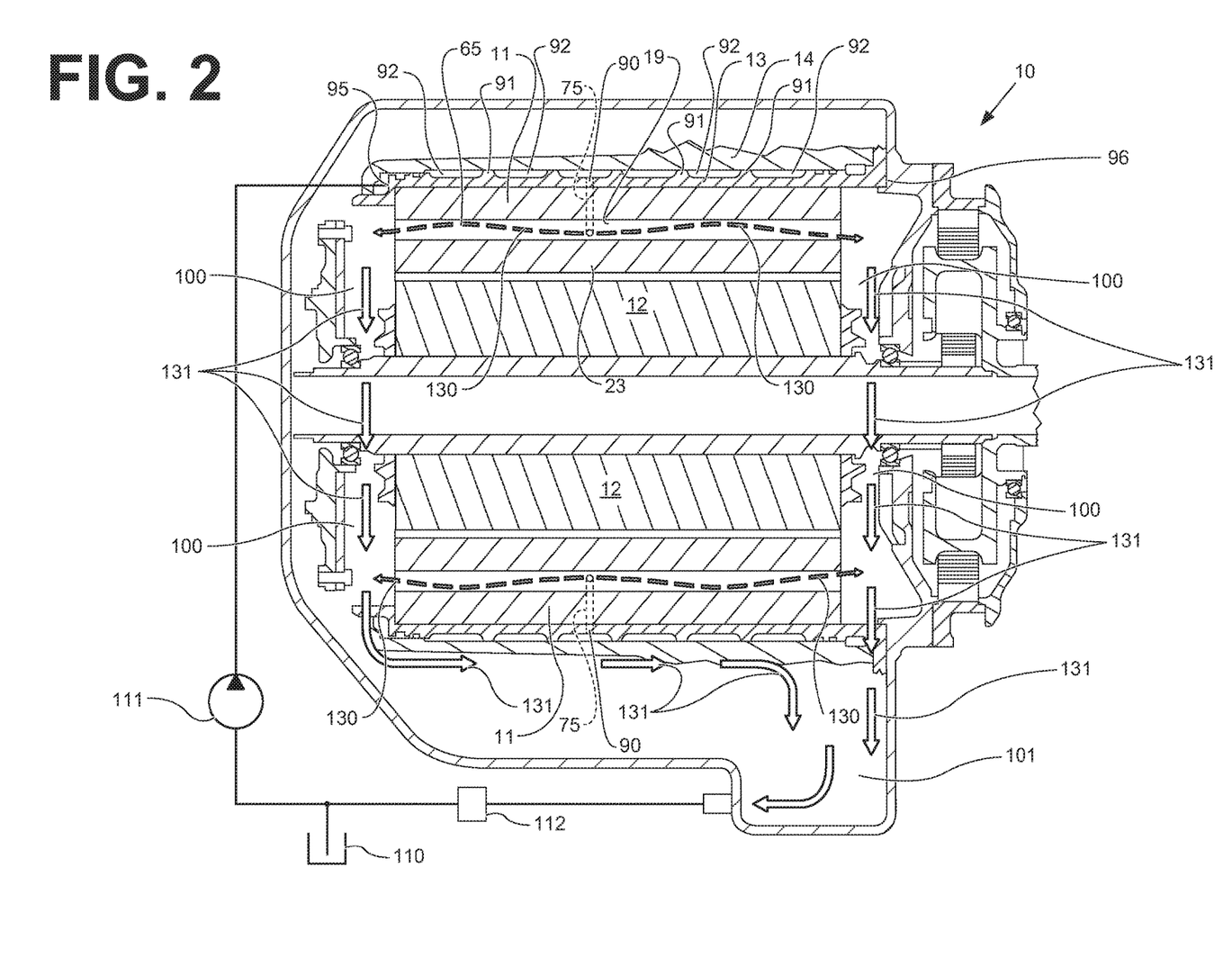
FIG. 2 is a section view of a switched reluctance motor incorporating the principles disclosed herein.

Referring to FIGS. 1-2 a rotary electric machine such as a switched reluctance motor 10 includes a stator 11 and a rotor 12 rotatably disposed therein. An annular stator jacket 13 surrounds and circumferentially engages an outer circumferential surface 19 of the stator 11. An outer housing 14 surrounds and circumferentially engages the outer circumferential surface of the stator jacket 13. The motor 10 includes an axis of rotation 27 about which the rotor 12 rotates.

The stator 11 has a stator body 16 with an inner circumferential surface 20 facing the rotor 12. A plurality of stator poles 17 extend radially inward from the inner circumferential surface 20 of the stator body 16. Each stator pole 17 has a pair of oppositely facing side surfaces 21. The space between the facing side surfaces 21 of adjacent stator poles 17 defines stator slots 22 into which the windings or conductive wires of the coils 30 are positioned. In other words, each stator pole 17 has a conductive winding or coil 30 wrapped therearound so that a portion of each coil is positioned in adjacent stator slots 22.

The coils 30 positioned about the stator poles 17 of each group of a phase set (A+, A−, and B+, B−) are electrically connected and may be configured as part of the electrical circuit, either in parallel or in series. The stator 11 may be formed by stacking a plurality of one-piece continuous annular iron members together. A layer of insulative material (not shown) may be provided between each iron member.

The rotor 12 has a rotor body 25 with a plurality of rotor poles 26 extending radially outward from the body. In a switched reluctance motor, the rotor 12 has no windings or magnets. The rotor 12 may be formed of a stack of laminated iron, one-piece continuous annular members (not shown). Rotors 12 having other structures and configurations are contemplated as would be apparent to one skilled in the art. In addition, while the motor of FIG. 2 is depicted as a switched reluctance motor, the concepts disclosed herein are applicable to other rotary electric machines such as a switched reluctance generator or one in which the rotor 12 has permanent magnets or some other structure or configuration.

As depicted, the stator 11 includes eight radially inwardly projecting stator poles 17 and the rotor 12 includes four radially outwardly projecting rotor poles 26. The number of phases of the switched reluctance motor 10 as well as the number of stator poles 17 and rotor poles 26 is exemplary only and is not intended to be limiting.

Figure 3:
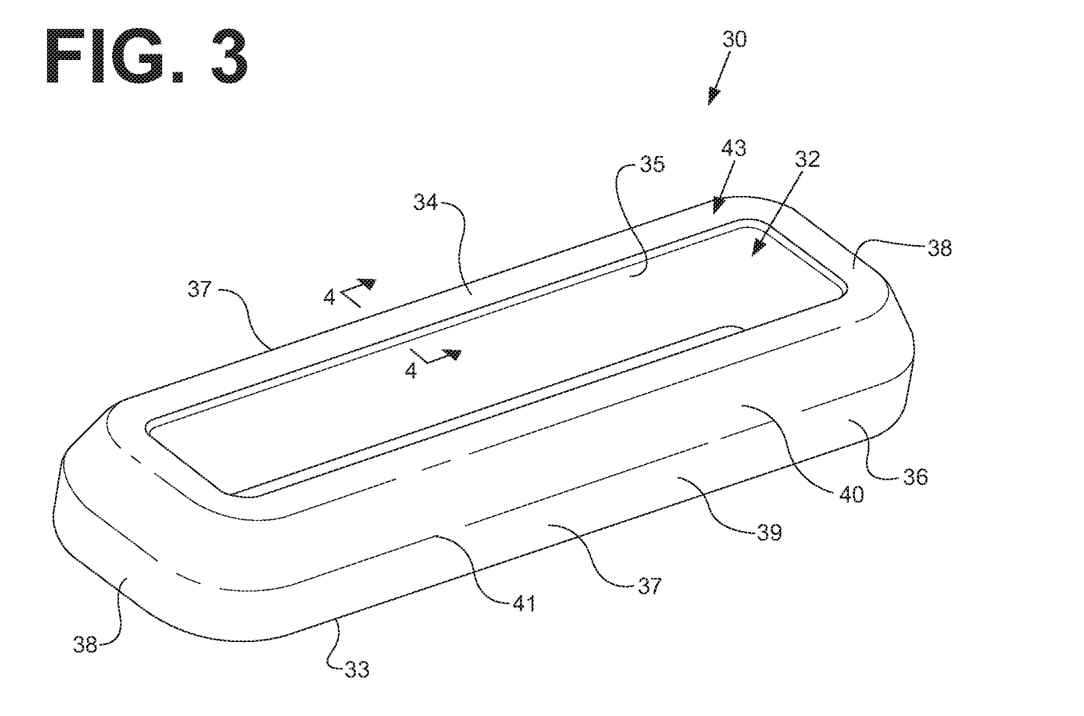
FIG. 3 is a perspective view of a coil used with the switched reluctance motor of FIG. 2.
Figure 4:
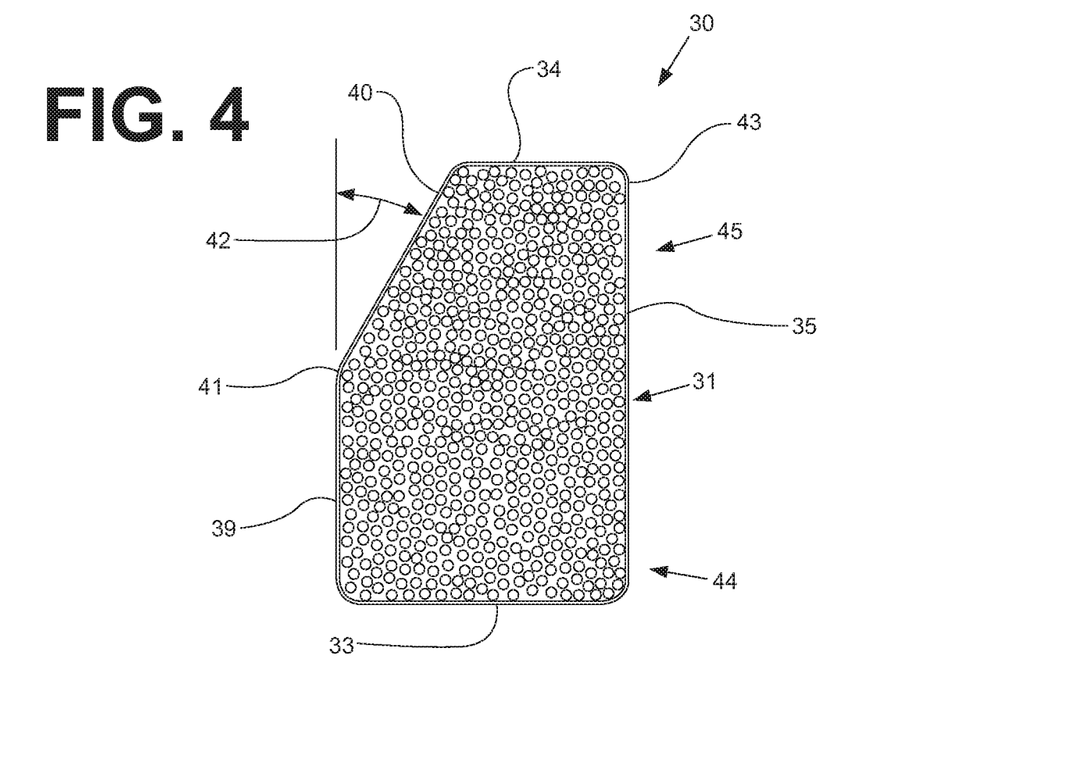
FIG. 4 is section of the coil of FIG. 3 taken generally along line 4-4.

Referring to FIGS. 3-4, each coil 30 may be formed of a plurality of electrically conductive wires 31 that define a group of wires that are wrapped in a generally oval manner a predetermined number of times or turns to define a central opening 32. The central opening 32 generally corresponds in size to the cross section of the stator poles 17 so that the coil 30 may be slid onto the stator pole during the fabrication of the switched reluctance motor 10.

Each coil 30 includes an insertion end 33 to be positioned generally adjacent the stator body 16 of the stator 11, and a rotor end 34 to be positioned opposite the insertion end and generally adjacent the end face of the stator pole 17. An inner surface 35 is configured to be positioned adjacent or in proximity to its respective stator pole 17 and a compound outer surface 36 generally faces opposite the inner surface 35. Accordingly, when viewed from the insertion end 33 or the rotor end 34, both the inner surface 35 and the outer surface 36 define generally oval surfaces. The insertion end 33 and the rotor end 34 interconnect the inner surface 35 to the compound outer surface 36. Each coil 30 has a pair of major sections 37 and a pair of minor sections 38, with each minor section interconnecting the pair of major sections.

The compound outer surface 36 includes a first leg section 39 and a second leg section 40. The first leg section 39 extends from the insertion end 33 of the coil 30 towards the rotor end 34. The second leg section 40 extends from the rotor end 34 towards the insertion end 33 and intersects with the first leg section 39 at intersection 41. The first leg section 39 and the second leg section 40 are positioned or configured at an angle 42 to each other at intersection 41. Accordingly, the first leg section 39 defines a first section 44 having a generally uniform width (i.e., the distance from the inner surface 35 to the outer surface 36). The second leg section 40 defines a second section 45 having a tapering width. The angle 42 may be based or dependent upon or the number of stator poles 17 of stator 11. In one embodiment, the angle 42 may be generally equal to 360 degrees divided by the number of stator poles 17. The coil 30 depicted in FIGS. 3-4 may be used with a stator 11 having twelve stator poles 17 and thus the angle 42 is configured as approximately 30 degrees. In many applications, the angle 42 may be between approximately 15 degrees and 60 degrees.

Although depicted in the drawings with the compound outer surface 36 extending around the entire outer surface of the coil 30, in some configurations only the major sections 37 may include the compound outer surface 36.

A heat resistant, electrically insulating layer or wrap 43 may be applied to the outer surface 36 of coil 30 along the major sections 37. In an example, the insulating wrap 43 may be formed of one or more materials such as Nomex®, Mylar®, Kapton®, mica, or others with similar properties. Further, the wrap 43 may be formed of different materials or combinations of materials and/or of different thicknesses at different locations about the coil 30. In some embodiments, the wrap 43 may form a rigid outer surface along all or a portion of the coil 30.

As depicted in FIG. 4, each electrically conductive wire 31 has a generally circular cross-section. The electrically conductive wires 31 may have a non-circular cross-section such as oval, square or rectangular in some configurations. The electrically conductive wires 31 may be formed of a highly conductive, flexible material, such as copper, and have a layer of insulation thereon. In an embodiment, magnet wires having a layer of enamel insulation may be used.

During assembly of the stator 11, the angle 42 between the first leg section 39 and the second leg section 40 permits the insertion end 33 of each coil 30 to be slid onto a stator pole 17 without engaging or contacting an adjacent coil that is mounted on an adjacent stator pole. In other words, the angle 42 creates a clearance or opening for the first leg section 39 of an adjacent coil 30 to pass through.

Figure 5:
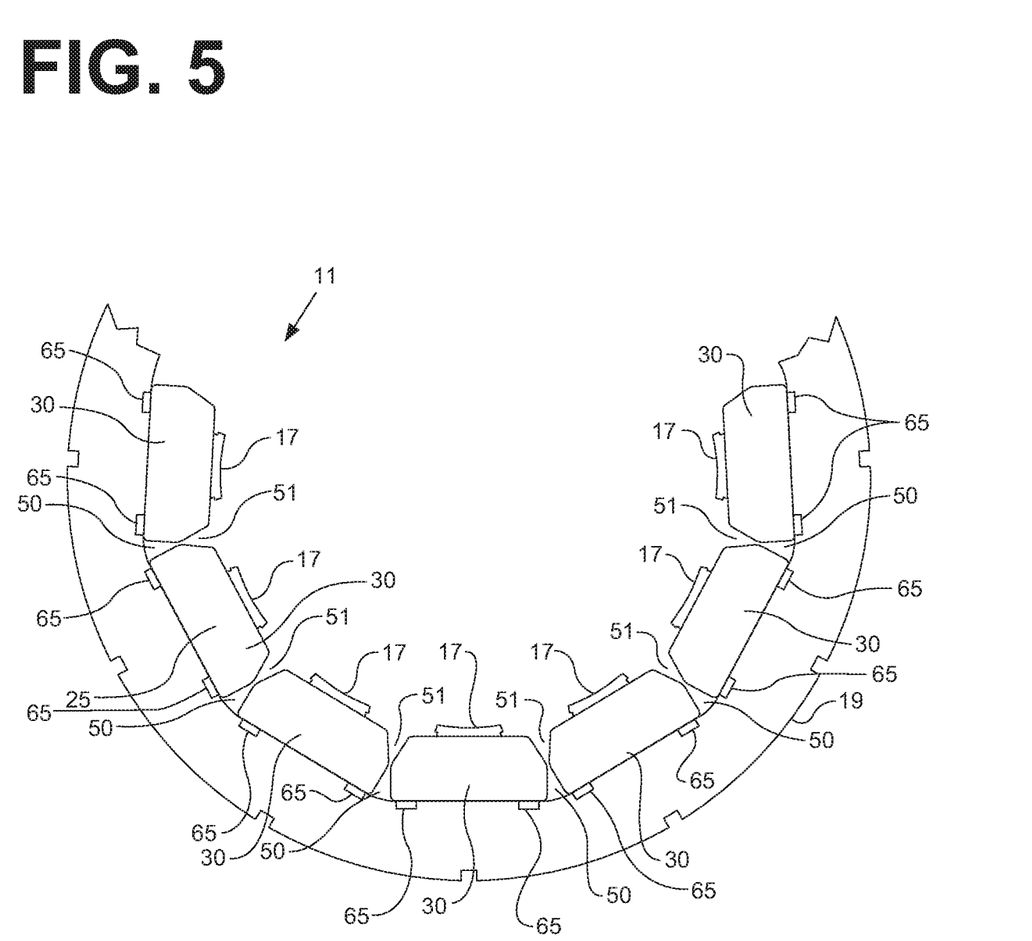
FIG. 5 is fragmented end view of a portion of the stator used with the switched reluctance motor of FIG. 2 with the coils of FIG. 3 disposed thereon.

Referring to FIG. 5, upon mounting the coils 30 on the stator poles 17, the space between the first leg sections 39 of adjacent coils defines a generally V-shaped first channel 50 adjacent the stator body 16 that extends along the entire length of the adjacent major sections 37 of the pairs of adjacent coils. The wider portion of the V-shaped first channel 50 is disposed adjacent the stator body 16. The space between the second leg sections 40 of adjacent coils 30 defines a generally V-shaped second channel 51 that also extends along the entire length of the adjacent major sections 37 of the pairs of adjacent coils. The V-shaped second channels 51 are configured in an opposite orientation to the V-shaped first channels 50 so the narrowest portions of the channels are closest together. The V-shaped first channels 50 and V-shaped second channels 51 may be in fluid communication with each other through the narrow portions of the channels.

During operation of the switched reluctance motor 10, rotation of the rotor 12 is achieved by the sequential excitation or energization of adjacent sets of stator poles 17 by supplying voltage pulses of a desired magnitude and duration to generate a DC current within the coils 30 of the stator poles 17. Energization of the stator poles 17 creates magnetic flux towards which the rotor poles 26 are attracted, which tends to align the rotor poles with the energized stator poles 17.

As the rotor poles 26 become aligned with a set of energized stator poles 17, the voltage pulse, and thus the DC current to the energized poles, is terminated and subsequently supplied to the next sequential stator poles 17. The rotor poles 26 are then attracted to the next set of sequential set of stator poles 17, which causes continued rotation of the rotor 12. This process is continued during operation of the switched reluctance motor 10. Torque is generated by the tendency of rotor poles 26 to align with energized stator poles 17. In the operation of a generator, the sequence of energizing and de-energizing the coils are reversed.

As a result of the operation of the switched reluctance motor 10, heat is generated within the motor 10. Cooling the switched reluctance motor 10 may result in more efficient operation and a longer life of the motor. In particular, a significant amount of heat may be generated by the coils 30. As a result, in some instances, oil, air, or another cooling fluid or medium may be routed through the V-shaped first channels 50 between the first leg sections 39 of adjacent coils 30 and the V-shaped second channels 51 between the second leg sections 40 of the adjacent coils to enhance cooling within the switched reluctance motor 10.

In order to increase the surface area of the coils 30 that oil, air, or another cooling fluid or medium may contact, spacers may be provided between the coils and the stator body 16 to define one or more fluid flow openings along the coils. Such fluid flow openings may take any form such as gaps or channels and may reduce the reliance on conduction between the stator jacket 13, the stator body 16, and the stator poles 17 to remove heat from the coils 30.

The spacers may have any desired configuration and/or construction. More specifically, referring to FIGS. 6-9, a plurality of spacers 60, 61, 63, 64 are integrally formed with the stator body 16 and the stator poles 17. As depicted, a pair of stator pole spacers 60, 61 are spaced apart along the side surface 21 of each stator pole 17. The stator pole spacer 60 may be disposed generally near or towards the intersection 24 of the inner circumferential surface 20 of the stator body 16 and the side surface 21 of the stator pole 17 while the stator pole spacer 61 may be disposed generally near the end 23 of the stator pole 17. The stator pole spacers 60, 61 define a stator pole opening 62 between the side surface 21 of the stator pole 17 and the inner surface 35 of the coil 30.

A pair of stator body spacers 63, 64 are spaced apart along the inner circumferential surface 20 of the stator body 16 adjacent each stator pole 17. The stator body spacer 63 may be disposed generally near or towards the intersection 24 of the inner circumferential surface 20 of the stator body 16 and the side surface 21 of the stator pole 17 while the stator body spacer 64 may be disposed along the inner circumferential surface 20 but spaced from the stator body spacer 63. The stator body spacers 63, 64 define a stator body opening 65 between the inner circumferential surface 20 of the stator body 16 and the insertion end 33 of the coil 30.

Figure 6:
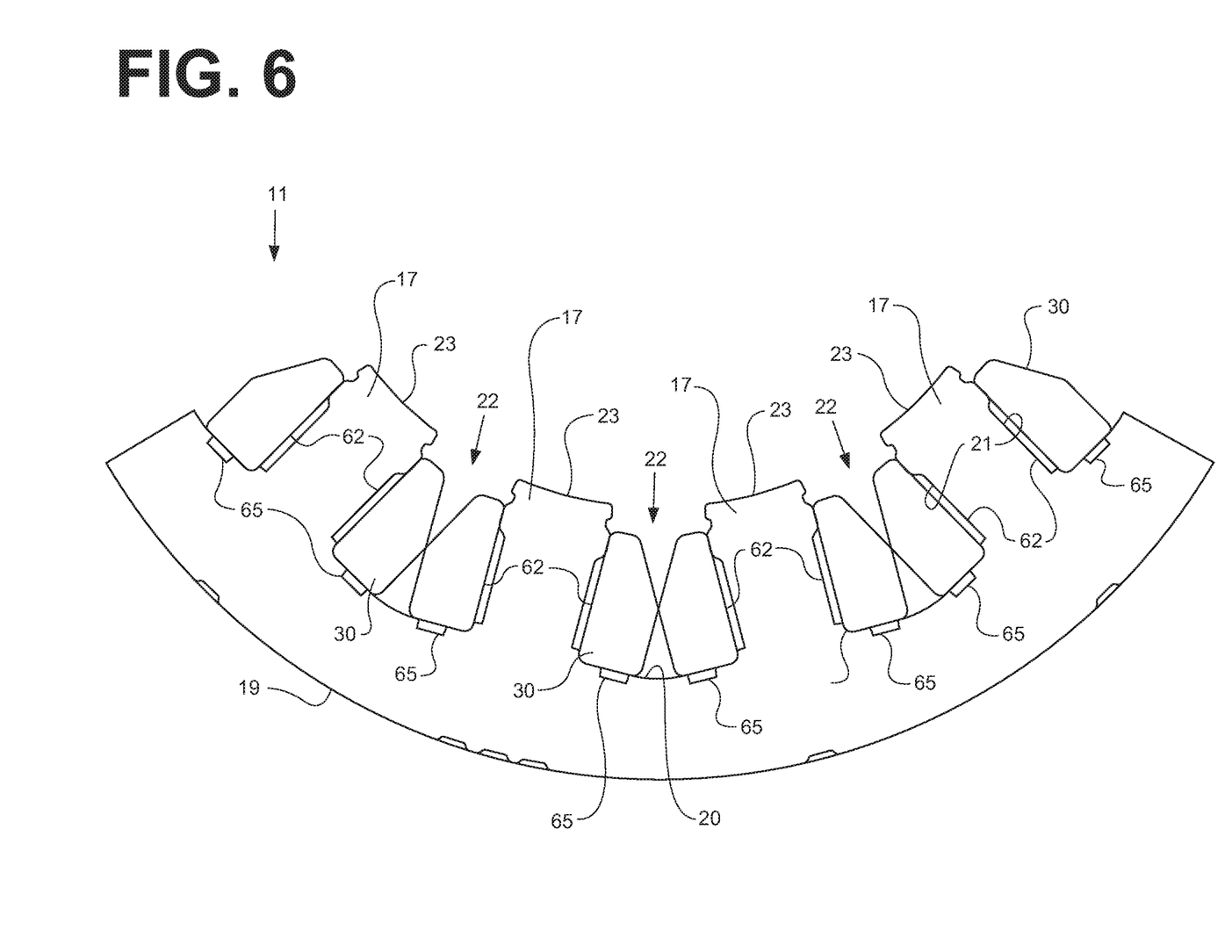
FIG. 6 is a fragmented end view similar to FIG. 5 but with the coils in section and depicting a first embodiment of spacers.
Figure 7:
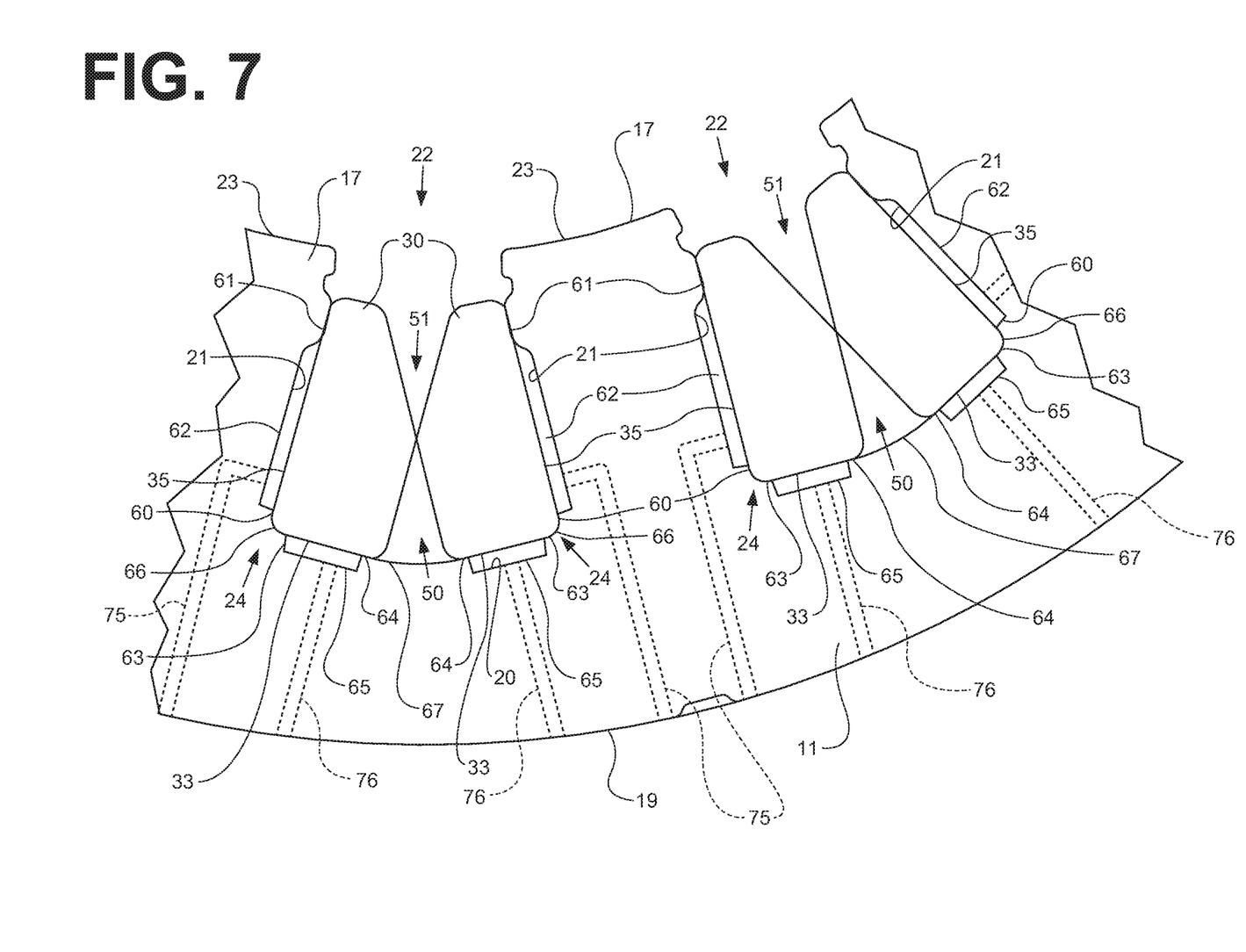
FIG. 7 is an enlarged fragmented end view of a portion of FIG. 6.

As depicted in FIGS. 6-9, the stator pole spacer 60 and stator body spacer 63 are connected so that the inner circumferential surface of the stator 11 is arcuate at the intersection of the corner 66 between the stator body 16 and the stator pole 17. Thus, in an embodiment, a single spacer element, rather than distinct spacers for each of the stator body 16 and the stator pole 17, may be used with the single spacer element supporting the coil 30 to space the coil from both the stator body and the stator pole. From the foregoing, it may be understood that the stator pole spacer 60 and the stator body spacer 63 may be separate, circumferentially spaced apart components or they may be interconnected at the corner 66. Further, the stator body spacers 64 along the inner circumferential surface 20 within a single stator slot 22 may be interconnected by a web 67 as depicted in FIGS. 6-7 or may be circumferentially spaced apart as separate elements along the inner circumferential surface.

Figure 8:
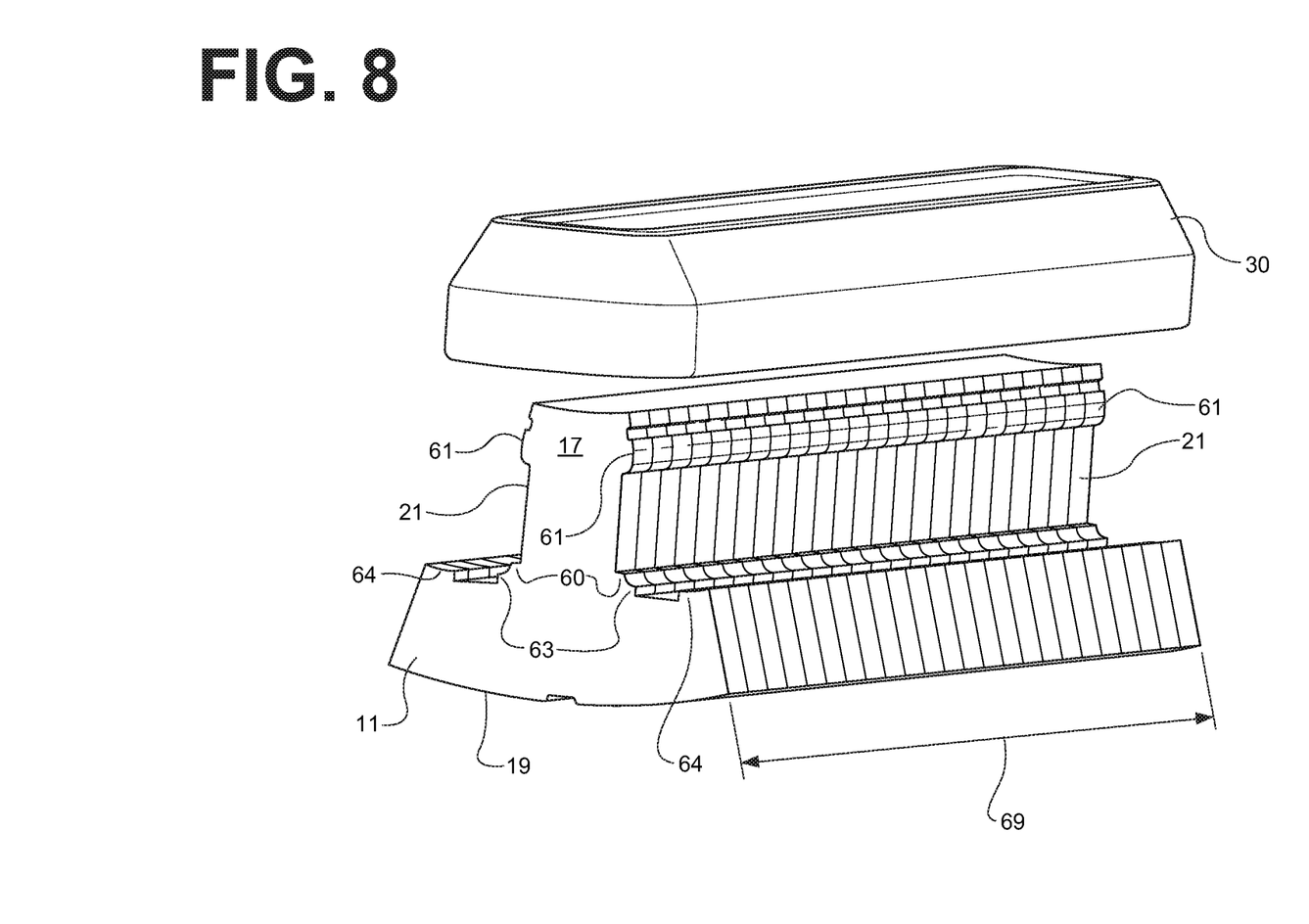
FIG. 8 is a fragmented exploded view of a stator pole and coil including a first embodiment of the spacers disclosed herein.

Referring to FIG. 8, in an embodiment, the stator pole spacers 60, 61 and stator body spacers 63, 64 may be elongated and extend along all or substantially all of the axial length 69 of the stator 11 (i.e., parallel to the axis of rotation 27 of the rotor). In such case, the stator pole opening 62 and the stator body opening 65 may define or characterize elongated fluid flow channels between the opposite axial ends of the stator 11.

Figure 9:
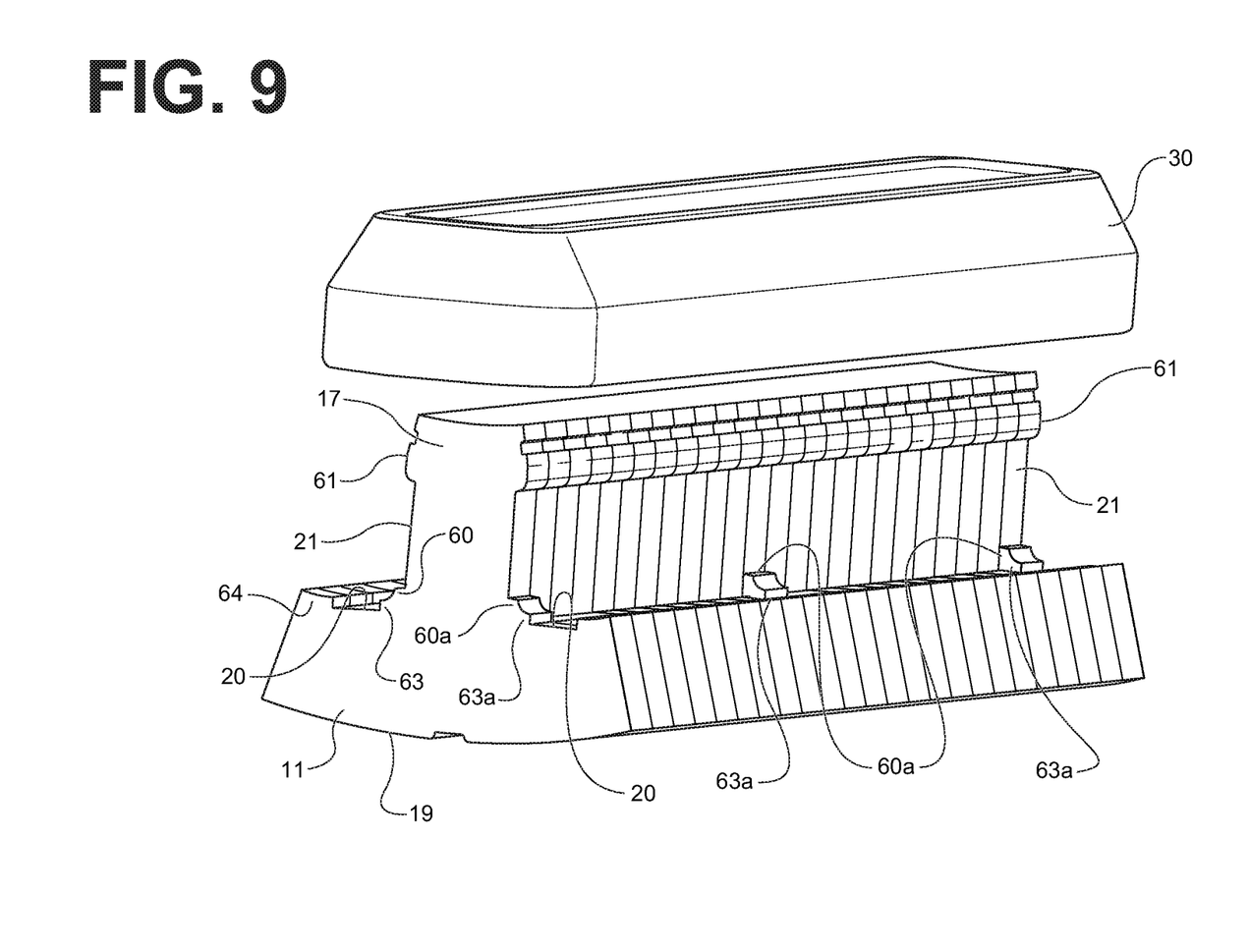
FIG. 9 is a view similar to FIG. 8 but of a second embodiment of the spacers disclosed herein.
Figure 10:
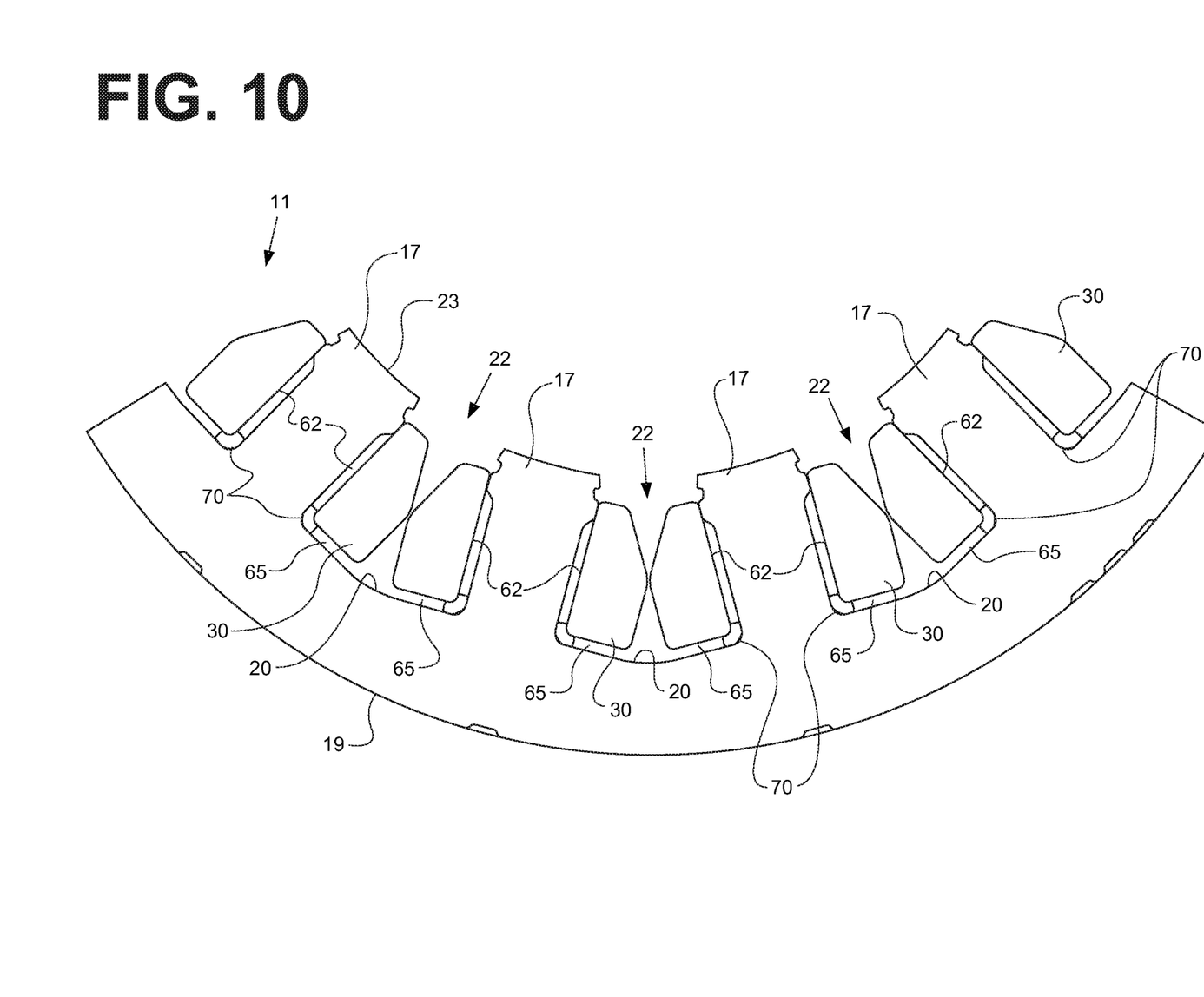
FIG. 10 is a fragmented and view similar to FIG. 6 but depicting a third embodiment of the spacers disclosed herein.
Figure 11:
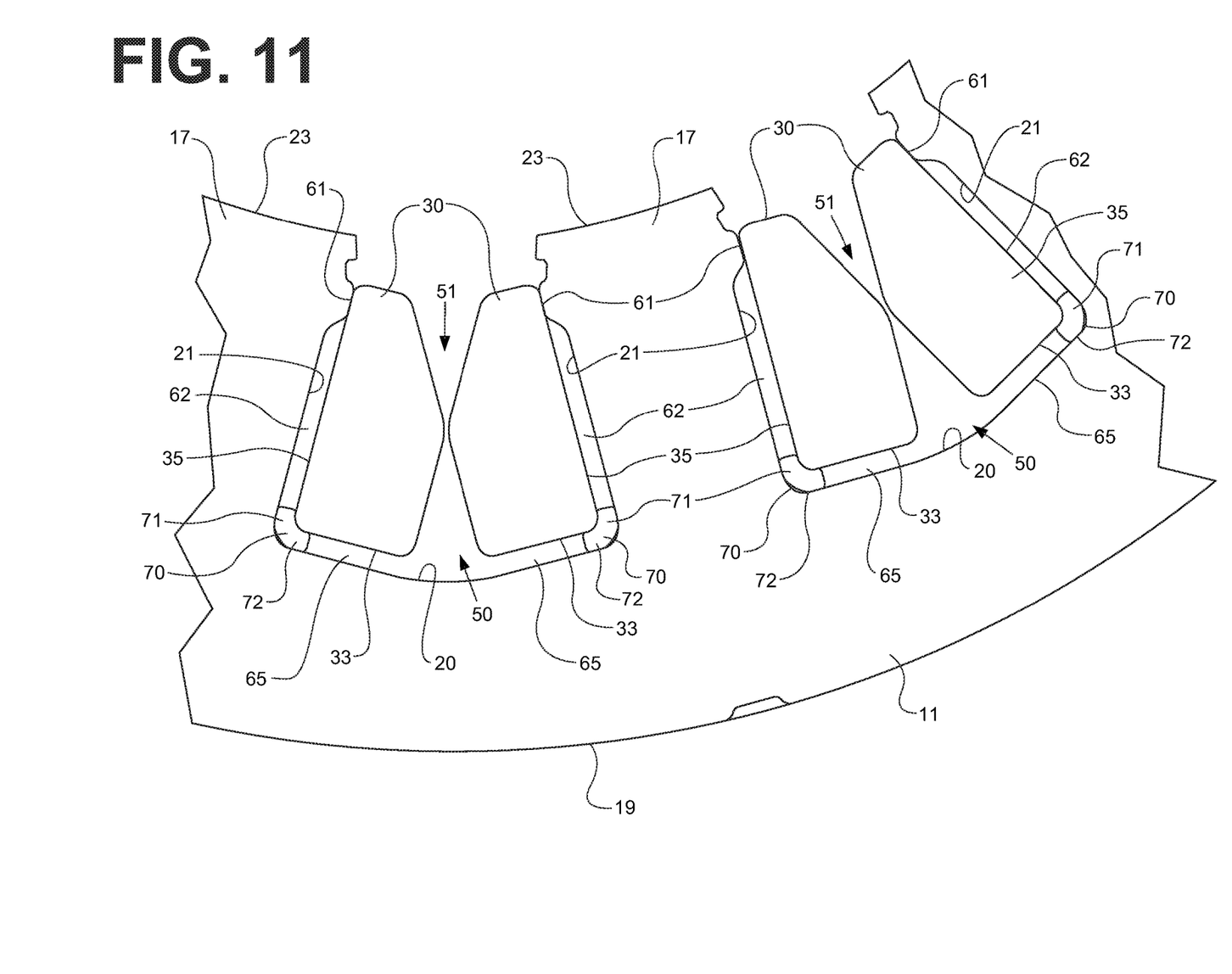
FIG. 11 is an enlarged fragmented end view of a portion of FIG. 10.

In another embodiment depicted in FIG. 9, rather than configuring the stator pole spacer 60 and stator body spacer 63 as elongated members that extend all or substantially all of the axial length 69 of the stator 11, the stator pole spacer 60 and stator body spacer 63 may comprise a plurality of individual, axially spaced apart spacer elements 60a, 63a. Such a configuration will permit the flow of cooling fluid between the stator pole opening 62 and the stator body opening 65. In such case, the stator pole opening 62 and stator body opening 65 may be characterized or referred to as fluid flow gaps rather than channels (although the stator pole opening 62 and the stator body opening 65 may operate together as a fluid flow channel or channels).

From the foregoing, it may be understood that the continuous, elongated stator pole spacers 60, 61 and the continuous, elongated stator body spacers 63, 64 may be formed by including the spacers on each layer or lamination used to form the stator body 16. To form the spaced apart stator pole spacers 60a and the stator body spacers 63a, such spacers may be included on only some of the layers or laminations used to form the stator body 16.

If desired, either or both of the stator pole spacer 61 and the stator body spacer 64 may also be formed as axially spaced apart members. Forming the stator pole spacers 61 of axially spaced apart members may facilitate the flow of cooling fluid past the rotor end 34 of the coil 30. Forming the stator body spacers 64 of axially spaced apart members may facilitate the flow of cooling fluid between adjacent stator body openings 65 within a stator slot 22.

Figure 12:
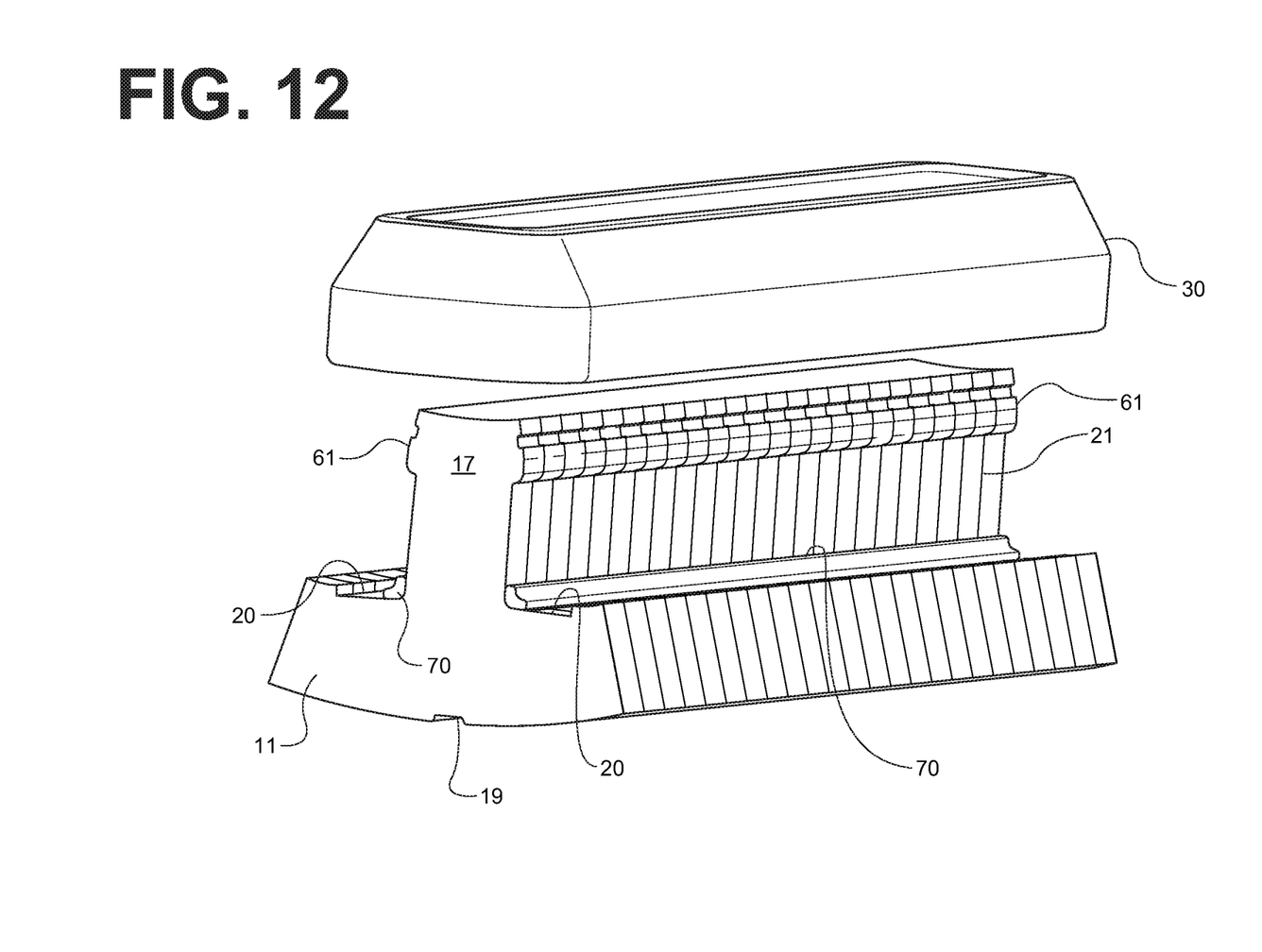
FIG. 12 is a fragmented exploded view of a stator pole and coil similar to FIG. 8 but including the third embodiment of the spacers disclosed herein.
Figure 13:
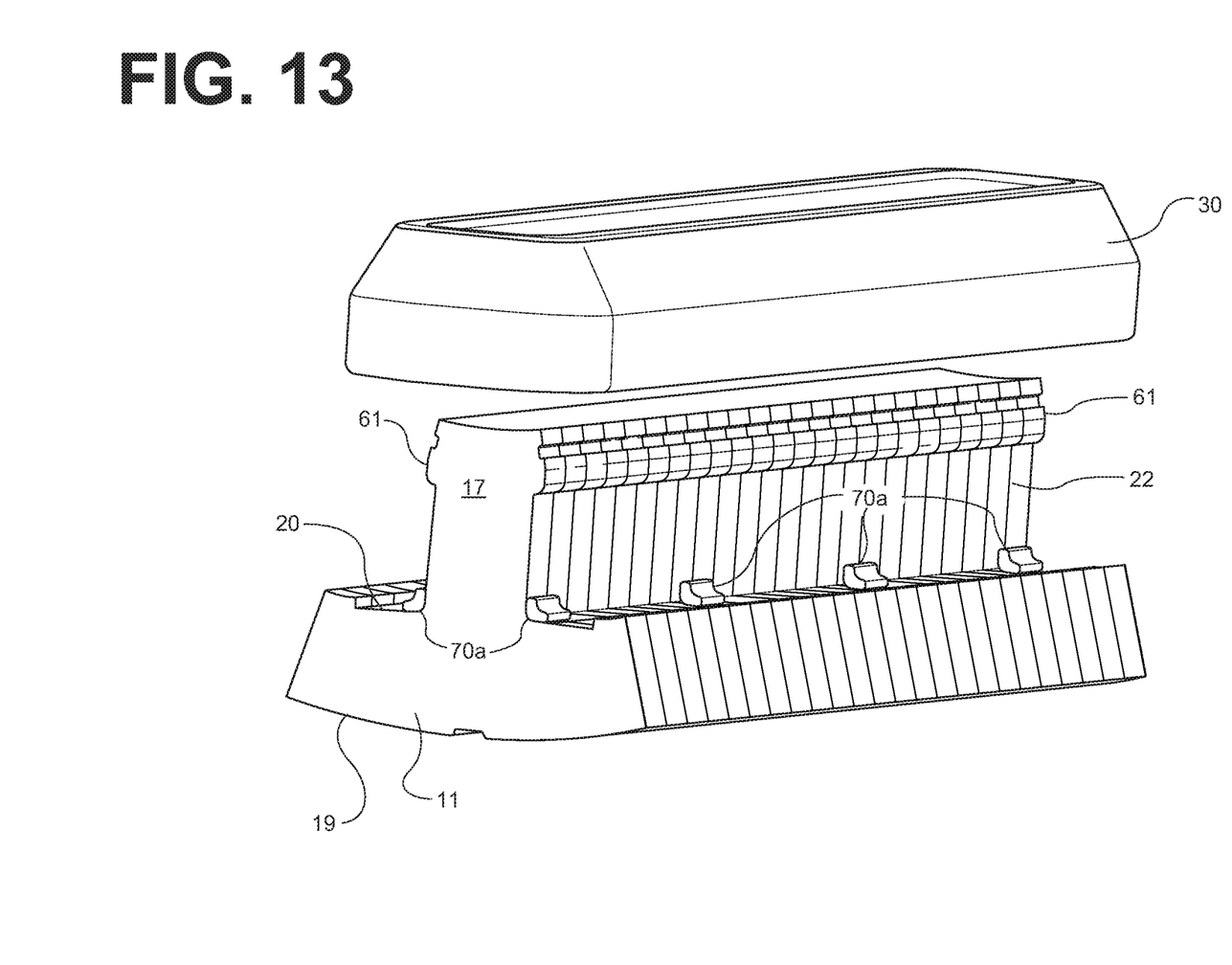
FIG. 13 is a view similar to FIG. 12 but of a fourth embodiment of the spacers disclosed herein.

In other embodiments, some or all of the stator pole spacers 60, 61 and the stator body spacers 63, 64 may be components that are formed separately from the stator 11. For example, referring to FIGS. 10-13, a spacer component 70 separate from the stator 11 is provided that includes a first leg 71 that functions as the stator pole spacer and a second leg 72 that functions as the stator body spacer. In the depicted embodiment, stator pole spacer 61 is integrally formed with the stator pole 17 and the stator body spacer 64 is integrally formed with the stator body 16 but in an alternate embodiment, such spacers may also be elements or members that are separately formed from the stator 11. The spacer component 70 may be a one-piece elongated member as depicted in FIG. 12 that functions in a manner similar or identical to the structure of FIG. 8 or may be formed as a plurality of axially spaced apart spacer elements 70a as depicted in FIG. 13 that function in a manner similar or identical to the structure of FIG. 9.

The spacer component 70 and the spacer elements 70a may be formed of any desired material. In an example, the spacer component 70 and the spacer elements 70a may be formed of an insulative material such as a high temperature plastic or resin. In another embodiment, the spacer component 70 and spacer elements 70a may be formed of fiberglass or another similar material. While depicted as being inserted into the stator slots 22 separately from the coils 30, in some embodiments it may be desirable to form the spacer component 70 and the spacer elements 70a as part of the insulative material of the coil or to subsequently affix the spacer component 70 and the spacer elements 70a to the coils and insert the coils and spacers into the slots in a single assembly operation.

Regardless of the manner in which the spacers are formed, the stator pole openings 62 and the stator body openings 65 may have any desired dimensions or configuration. In embodiments, the size of the stator pole openings 62 and stator body openings 65 may be configured to maximize the amount of surface area of the coil 30 exposed to the cooling fluid. Further, in embodiments, the width of the stator pole openings 62 and stator body openings 65 (i.e., the distance between the coil 30 and the stator pole 17 or the stator body 16, respectively) may be selected to optimize the cooling characteristics and/or flow rate of the cooling fluid through the openings. For example, it may be desirable to configure the stator pole openings 62 and stator body openings 65 to maximize the velocity of the cooling fluid through the openings to increase the efficiency of the heat transfer process.

In an embodiment, each of the stator pole openings 62 and stator body openings 65 may have a width of approximately 2 mm. In another embodiment, each of the stator pole openings 62 and stator body openings 65 may have a width of approximately 1-3 mm. In still another embodiment, each of the stator pole openings 62 and stator body openings 65 may have a width of approximately 0.5-2.5 mm. Stator pole openings 62 and stator body openings 65 of other sizes and ranges are contemplated.

Although depicted with the width of the stator pole openings 62 and stator body openings 65 (i.e., the distance between the coil 30 and the stator pole 17 or the stator body 16, respectively) being equal, the openings may have different widths. Further, in some embodiments, the stator 11 may include only stator pole opening 62 or stator body openings 65.

Cooling fluid may be supplied by a fluid system through the stator pole opening 62 and/or the stator body openings 65 adjacent the coils 30 in any desired manner to achieve the desired cooling result. In a relatively simple example that is not shown, a first end of the stator pole openings 62 and the stator body openings 65 may be configured to function as inlet ports and the opposite second end of the openings may be configured to function as outlet ports. Cooling fluid may be directed through the stator pole openings 62 and the stator body openings 65 between the first end and the second end to cool the coils 30.

Referring to FIG. 2, a switched reluctance motor 10 is depicted with a more complex cooling system. In an embodiment, cooling fluid is first supplied in a circumferential manner between the stator jacket 13 and the outer housing 14 and then radially through the stator jacket and into bores in the stator body 16. The cooling fluid passes axially through the stator pole openings 62 and the stator body openings 65 and out of both the first and second ends of the openings. Other manners of supplying cooling fluid are contemplated.

More specifically, in an embodiment, an opening or bore 75 (FIGS. 2, 7) extends radially through the stator body 16 and one of the stator poles 17 and intersects with the stator pole openings 62 on opposite sides of the stator pole. Each bore 75 is in fluid communication with the stator pole openings 62 and thus acts as an inlet port for fluid to enter the stator pole openings. Similarly, an opening or bore 76 (FIG. 7) extends radially through the stator body 16 at a location that is aligned with one of the stator body opening 65. Each bore 76 is in fluid communication with the stator body opening 65 and thus acts as an inlet port for fluid to enter the stator body opening. The cooling fluid passes through each of the bores 75, into their respective stator pole openings 62, and out of both the first and second ends of the openings. Similarly, the cooling fluid passes through each of the bores 76, into their respective stator body opening 65, and out of both the first and second ends of the opening.

The stator jacket 13 may include a plurality of radial openings or jacket bores 90 with each jacket bore aligned with one of the bores 75, 76 that extends into the stator 11. In an embodiment, the stator jacket 13 may include a plurality of radially projecting circumferential ridges 91 (FIGS. 2, 14) that extend outward and engage the outer housing 14. The circumferential ridges 91 and the inner surface of the outer housing 14 define a plurality of outer cooling channels 92 configured in a continuous spiral manner. In other words, the circumferential ridges 91 define a continuous spiral circumferential channel that extends around the outer surface of the stator jacket 13 a plurality of times beginning at a first edge 93 of the stator jacket and ending at the second, opposite edge 94.

Figure 14:
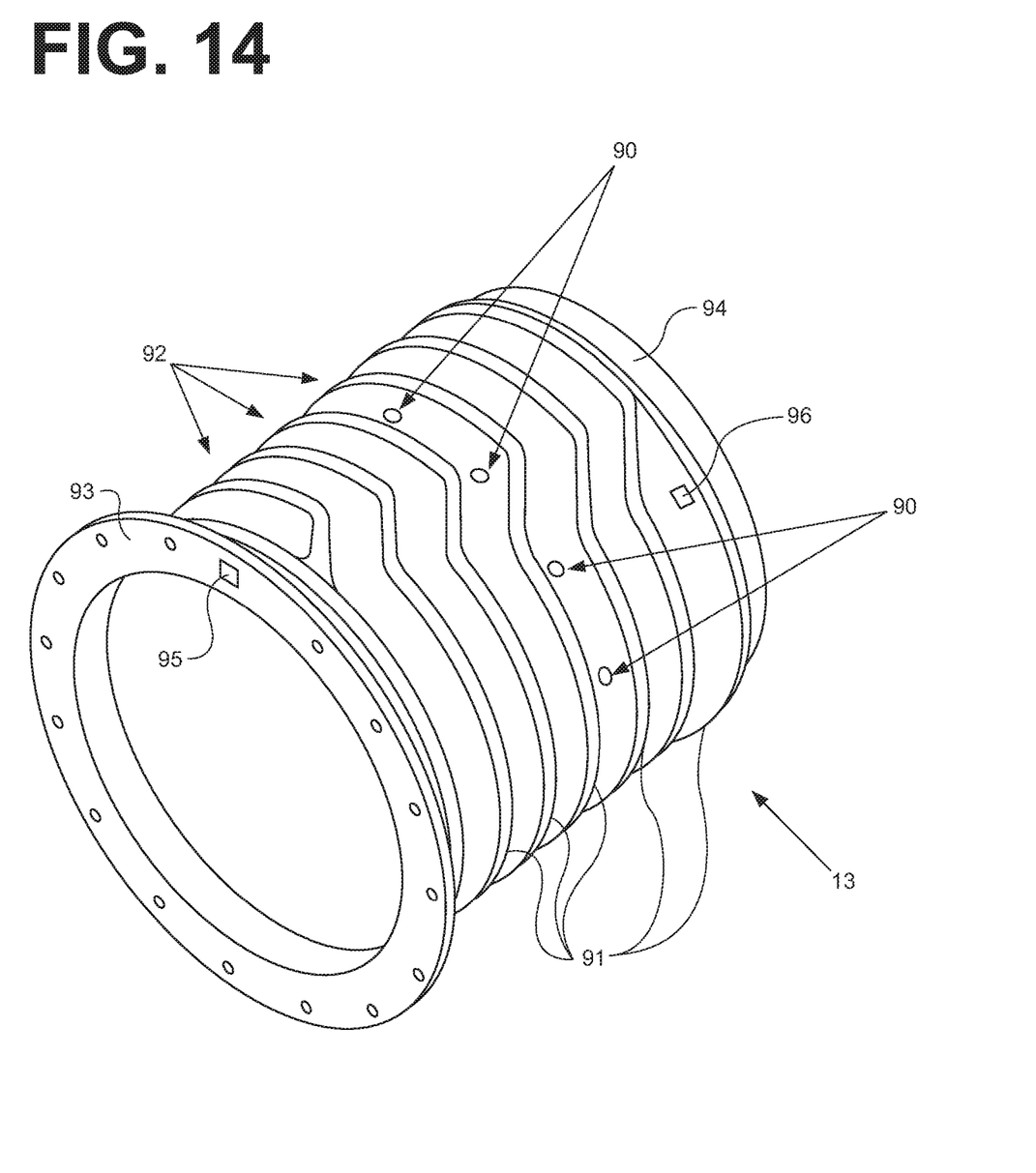
FIG. 14 is a perspective view of a stator jacket used with the switched reluctance motor of FIG. 2.

In an embodiment, a first port 95, functioning as a first inlet, may be provided at the first edge 93 of the stator jacket 13 and a second port 96, functioning as a second inlet, may be provided at the second edge 94 of the stator jacket. Upon providing cooling fluid through each of the first and second inlets, the cooling fluid travels in a spiral manner through the continuous circumferential channel towards and through the bores 90 that extend through the stator jacket 13.

Other manners of directing cooling fluid through the stator pole openings 62 and stator body opening 65 are contemplated. For example, in other embodiments, cooling fluid may be directed into each of the bores 75, 76 in the stator 11 without utilizing the circumferential cooling channels on the stator jacket 13.

The outer housing 14 may include gravity return channels 100 (FIG. 2) along the ends of the stator 11 and the rotor 12 that operate as cooling fluid return paths. As depicted by arrows 131 in FIG. 2, the cooling fluid passes through the gravity return channels 100 as a result of gravity and travels to a sump 101 within or associated with the outer housing 14. The cooling fluid may flow through a radiator 112 to cool the fluid and then flows back to a tank 110 where it may then be redirected by a pump 111 back to the inlets of the stator jacket 13. The switched reluctance motor 10, radiator 112, the tank 110, and the pump 111 thus define a fluid system for cooling the motor. In one configuration, the tank 110 and pump 111 may be self-contained or configured as part of the switched reluctance motor 10. In another configuration, the tank 110 and pump 111 may be separate components spaced from the switched reluctance motor 10. The radiator 112 may be disposed at any location along the fluid path such as upstream or downstream from or between the tank 110 and pump 111.

Although the coils 30 are depicted with compound outer surfaces 36, the principles disclosed herein may be used with any type or configuration of coil. Further, although the coils 30 are depicted with a wrap 43 surrounding each surface of the coils, in alternate embodiments, the coils may not include a wrap on some or all of the surfaces.

INDUSTRIAL APPLICABILITY

The industrial applicability of the rotary electric machine described herein will be readily appreciated from the foregoing discussion. The foregoing discussion is applicable to rotary electric machines such as switched reluctance motors 10 in which it is desirable to increase the electrical efficiency and performance of the rotary electric machine as well as improve the lifespan of the rotary electric machine.

The configuration of the coil 30 together with the stator pole openings 62 and the stator body openings 65 improve electrical efficiency and performance and increase the lifespan of the rotary electric machine by improving the cooling of the machine. As a result of the improved cooling function, the rotary electric machine may be operated in a manner that will generate more power and more heat without a resultant decrease in lifespan.

In operation, the pump 111 directs cooling fluid from the tank 110 into the first and second inlets at the ports 95, 96 of the stator jacket 13 and travels through the spiral channel 102 to the bores 90 in the stator jacket. The cooling fluid passes radially through the bores 90 in the stator jacket 13, into the bores 75, 76 that extends into the stator 11, and into the stator pole openings 62 and the stator body openings 65. The cooling fluid is forced axially through the stator pole openings 62 and the stator body openings 65 and out the ends of the openings. The cooling fluid then passes as a result of gravity through the channels 100 in the outer housing 14 along the ends of the stator 11 and the rotor 12. After passing through the channels 100, the cooling fluid travels to the sump 101 and back to the tank 110.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A rotary electric machine comprising:
a stator having a stator body, the stator body having an inner circumferential surface and a plurality of stator poles extending radially away from the inner circumferential surface of the stator body, each stator pole having a pair of oppositely facing side surfaces, the side surfaces of adjacent stator poles facing each other;
a rotor positioned within the stator and having a plurality of rotor poles;
a plurality of coils, one coil being disposed about each stator pole, each coil having a plurality of electrically conductive wires defining a group of wires, the group of wires being wrapped in a generally oval manner to define a central opening and disposed around its respective stator pole to define a plurality of turns of the group of wires about the stator pole, each coil further having an inner surface adjacent the central opening and positioned generally adjacent the side surfaces of its respective stator pole, an insertion end positioned generally adjacent the stator body, and a rotor end positioned opposite the insertion end, and
a plurality of spacers, each of the plurality of spacers being disposed between at least one of (i) the inner circumferential surface of the stator body and the insertion end of at least one of the plurality of coils to define a fluid flow opening configured as a stator body opening there between and (ii) the side surfaces of the stator pole and the inner surface of at least one of the plurality of coils to define a fluid flow opening configured as a stator pole opening there between.

2. The rotary electric machine of claim 1, wherein the spacers are integrally formed as part of the stator.

3. The rotary electric machine of claim 1, wherein the spacers are integrally formed as part of the coil.

4. The rotary electric machine of claim 1, wherein the spacers are components distinct from the stator and the coil.

5. The rotary electric machine of claim 1, wherein the spacers are stator body spacers and are disposed along the inner circumferential surface of the stator body at the intersection with and adjacent to the stator pole.

6. The rotary electric machine of claim 5, further including additional spacers that are stator pole spacers disposed along the side surfaces of the plurality of stator poles at the intersection with the inner circumferential surface of the stator body to define defining additional fluid flow openings between the coil and the stator.

7. The rotary electric machine of claim 6, wherein the fluid flow opening and an adjacent additional fluid flow opening are in fluid communication.

8. The rotary electric machine of claim 1, wherein the spacers are stator pole spacers and are disposed along the side surfaces of the plurality of stator poles proximate the end of the stator pole.

9. The rotary electric machine of claim 1, wherein each coil includes a pair of major sections and a pair of minor sections, each minor section interconnecting the pair of major sections, and each major section being positioned adjacent a major section of an adjacent coil.

10. The rotary electric machine of claim 9, wherein each spacer is an elongated member that extends along one of the major sections of one of the coils.

11. The rotary electric machine of claim 10, wherein the spacers define an elongated fluid flow channel between each coil and the stator.

12. The rotary electric machine of claim 9, further comprising a plurality of spacers disposed in a spaced apart relationship along each major section of each coil.

13. The rotary electric machine of claim 1, further including at least one inlet port that extends through a portion of the stator and is in fluid communication with the fluid flow openings.

14. The rotary electric machine of claim 13, wherein the at least one inlet port extends through the stator at approximately a longitudinal midpoint of the fluid flow openings.

15. The rotary electric machine of claim 13, wherein the fluid flow openings include an outlet port at each opposite end of the fluid flow openings.

16. The rotary electric machine of claim 13, further comprising an annular stator jacket surrounding and engaging an outer circumferential surface of the stator, the annular stator jacket including openings aligned with and in fluid communication with the at least one inlet port.

17. The rotary electric machine of claim 1, wherein each coil includes a compound outer surface, the compound outer surface includes a first leg section and a second leg section at an angle to the first leg section, the first leg sections of each pair of adjacent coils define a first generally V-shaped channel and the second leg sections of each pair of adjacent coils define a second generally V-shaped channel.

18. A rotary electric machine comprising:
a stator having a stator body, the stator body having an inner circumferential surface and a plurality of stator poles extending radially away from the inner circumferential surface of the stator body, each stator pole having a pair of oppositely facing side surfaces, the side surfaces of adjacent stator poles facing each other;
a rotor positioned within the stator and having a plurality of rotor poles;
a plurality of coils, one coil being disposed about each stator pole, each coil having a plurality of electrically conductive wires defining a group of wires, the group of wires being wrapped in a generally oval manner to define a central opening and disposed around its respective stator pole to define a plurality of turns of the group of wires about the stator pole, each coil further having an inner surface adjacent the central opening and positioned generally adjacent the side surfaces of its respective stator pole, an insertion end positioned generally adjacent the stator body, and a rotor end positioned opposite the insertion end,
a plurality of spacers, each of the plurality of spacers being disposed between at least one of (i) the inner circumferential surface of the stator body and the insertion end of at least one of the plurality of coils to define a fluid flow paths configured as a stator body opening there between and (ii) the side surfaces of the stator pole and the inner surface of at least one of the plurality of coils to define a fluid flow opening configured as a stator pole opening there between;
a port adjacent at least one end of the fluid flow opening; and
a fluid system including a cooling fluid that flows through the fluid flow opening and through the port.

19. The rotary electric machine of claim 18, wherein the port adjacent the at least one end of the fluid flow opening is an outlet port.

20. The rotary electric machine of claim 18, further including an inlet port that extends through a portion of the stator and is in fluid communication with each fluid flow opening.

* * * * *